J. WEDDLE.
AUTOMATIC HAY HOLDER.
APPLICATION FILED AUG. 29, 1908.
932,524. Patented Aug. 31, 1909.
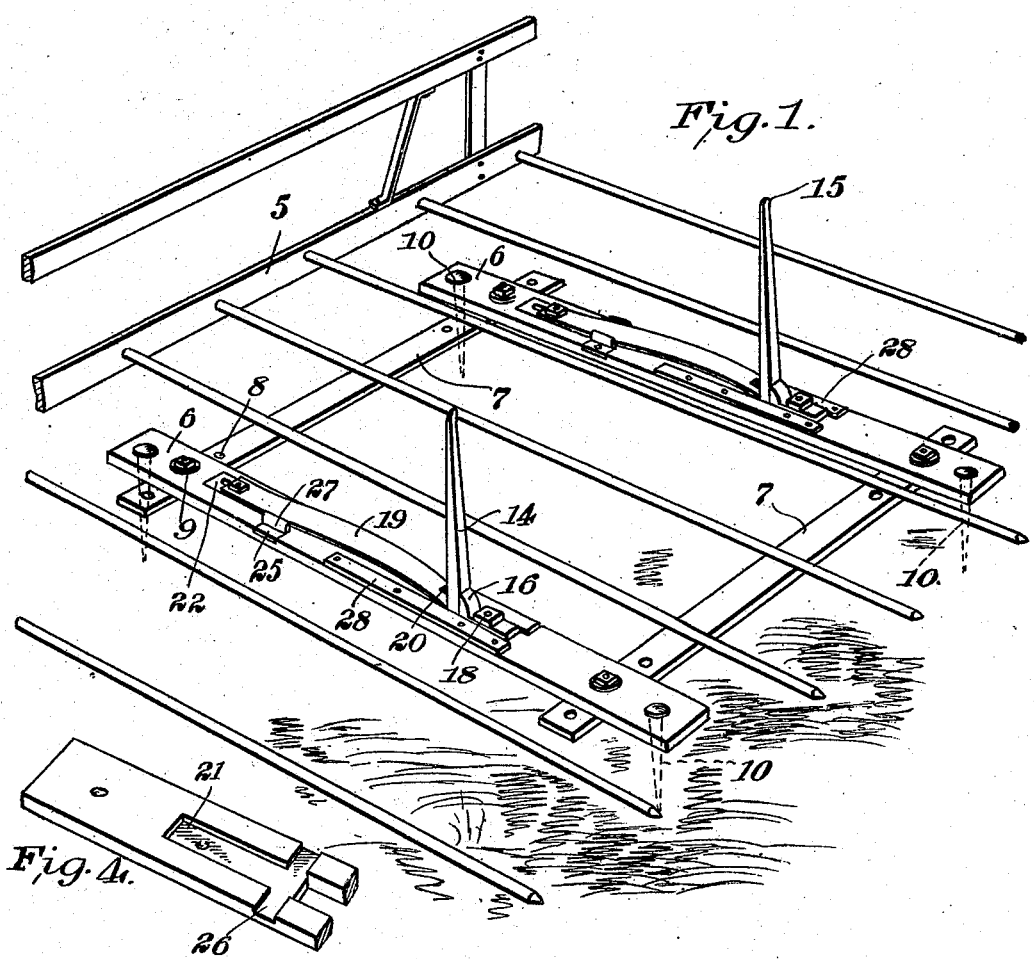
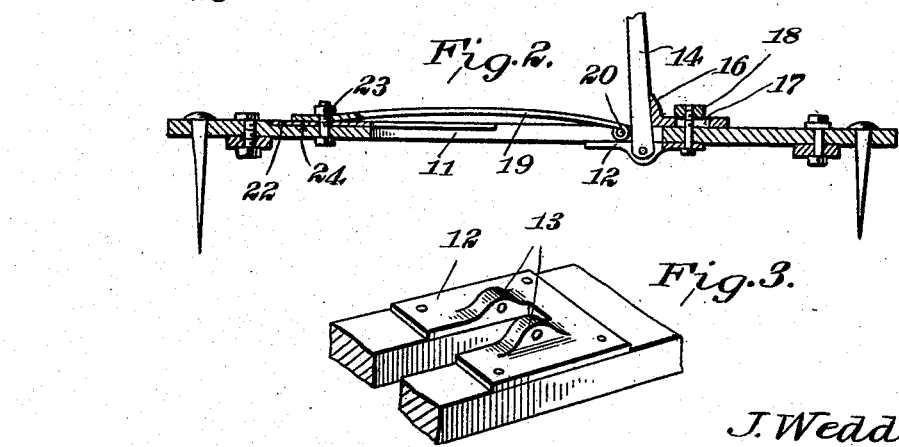
Witnesses
Inventor
J. Weddle,
By
Attorneys

UNITED STATES PATENT OFFICE.

JOHN WEDDLE, OF LEBANON, KANSAS.

AUTOMATIC HAY-HOLDER.

932,524. Specification of Letters Patent. Patented Aug. 31, 1909.

Application filed August 29, 1908. Serial No. 450,869.

*To all whom it may concern:*

Be it known that I, JOHN WEDDLE, a citizen of the United States, residing near Lebanon, in the county of Smith and State of Kansas, have invented an Automatic Hay-Holder, of which the following is a specification.

This invention relates to retarding devices for hay stackers.

Heretofore in transferring a load of hay, or other material from a hay rake or buck to the lifting teeth or carrier of a hay stacker, considerable difficulty has been experienced in preventing accidental displacement of a portion of the load deposited on said carrier, this being due to the fact that when the rake or buck is withdrawn, in the act of dumping the hay on the carrier, a portion of the said hay is also withdrawn, thus rendering it necessary to employ two or more men at each stacker for the purpose of preventing rearward sliding movement of the load.

The object of the present invention is to obviate this difficulty, and to provide means for holding or retaining the hay during the rearward movement of the rake or buck, thereby to retain the load of hay in position on the carrier for delivery to the stack.

A further object of the invention is to provide a hay retarder including a supporting frame having spring actuating teeth or retarding devices, projecting laterally therefrom, and extended into the path of movement of the hay rake or buck, said teeth being depressed by the rake or buck when the latter is positioned over the elevating device or carrier of the stacker and movable automatically to upright or operative position when the rake is withdrawn from over the elevating device or carrier of said stacker.

A still further object of the invention is generally to improve this class of devices so as to increase their utility, durability and efficiency.

Further objects and advantages will appear as the description proceeds, and with these in view, the invention consists in certain constructions, arrangements and combinations of the parts that I shall herein after fully describe and claim.

For a full understanding of the invention and the merits thereof, and also to acquire a knowledge of the details of construction and the means for effecting the result, reference is to be had to the following description and accompanying drawings, in which;

Figure 1 is a perspective view of a hay retarder frame constructed in accordance with my invention, the elevating teeth of the stacker being shown in position thereon; Fig. 2 is a longitudinal sectional view; Fig. 3 is a detail perspective view of a portion of one of the longitudinal bars of the frame, looking at the lower face thereof; and Fig. 4 is a similar view looking at the upper face of the bar, with the main and auxiliary springs removed.

Corresponding and like parts are referred to in the following description and indicated in all the views of the drawings by the same reference characters.

The improved hay retarder forming the subject matter of my invention is purposely designed for use in conjunction with a hay stacker or similar machine for lifting or elevating hay, and by way of illustration is shown in connection with a stacker of the ordinary construction, the lifting teeth or carrier of which is indicated at 5.

The device comprises a supporting frame, including spaced longitudinal bars 6, connected by transverse bars or sills 7, the latter being provided with a series of openings 8, for the reception of bolts or similar fastening devices 9, preferably disposed at the junction of the strips 6 and 7 and which serve to retain said strips rigidly in a fixed position. The supporting frame is adapted to be positioned beneath the elevating teeth of the hay stacker when said teeth are in lowered position, and in order to prevent accidental displacement of said frame, suitable pins or anchoring devices 10 are secured to the opposite ends of the longitudinal bars 6 and adapted to be driven or otherwise embedded in the ground, as shown.

The bars 6 are provided with longitudinally disposed slots 11 and secured to the lower face of each bar at one end of the adjacent slot is a plate 12 having spaced ears 13 between which is pivotally mounted a retarding finger. The retarding fingers 14 normally project upwardly through the adjacent slots 11 and between the teeth of the elevating device 5, said retarding members being preferably disposed at a slight angle or inclination with respect to the horizontal plane of the supporting frame and each provided with a curved terminal 15 in order to prevent the hay or other material being delivered from adhering thereto.

Secured in any suitable manner to the upper surface of each longitudinal bar 6 is an adjustable block 16, the enlarged end of which forms an abutment or stop for engagement with the adjacent retarding finger 14, thereby to prevent rearward tilting movement of the same. The reduced end of the block 16 is provided with an elongated slot 17, through which passes a bolt or similar fastening device 18, so that the block may be adjusted longitudinal of the bar 6, for the purpose of adjusting the angle or inclination of the retarding finger.

Disposed above each slot 11 is a flat leaf spring 19, the free end of which is movable through the slot 11 and is provided with a terminal anti-frictional roller 20 which presses against one side of the adjacent retarding finger 14 thereby to normally and yieldably support said finger in upright position. Arranged beneath the rear end of the spring 19 and seated in a longitudinal groove 21 is an auxiliary spring 22, secured to the main spring 19 by a bolt 23. The bolts 23 pass through elongated slots 24 formed in the main and auxiliary springs so that the said springs may be adjusted relatively to the same and thus control the movement of the retarding fingers. The springs 19 and 22 are centered longitudinal of the bars 6 by means of clips or brakes 25, the latter being seated in transverse grooves 26 in the bars 6 and provided with upstanding ears 27 which bear against the longitudinal edges of the springs, as shown.

Under normal conditions the terminals of the retarding fingers project upwardly between the teeth or tines of the member 5 and are arranged in the path of movement of the hay rake or buck so that when the latter is positioned over the elevating teeth 5 the hay rake will depress the retarding fingers against the action of the main and auxiliary springs 19 and 22, and permit the load to be deposited on said elevating device. As the rake or buck is withdrawn from a position over the elevating device or carrier 5 the springs 19 will automatically raise the retarding fingers which latter will engage the hay and prevent accidental displacement of the same during the rearward movement of the hay rake. It is obvious that when the hay is elevated by the lifting teeth 5 to the stack the retarding fingers will automatically assume an upright position, and in which position they will again be depressed to prevent the displacement of the hay when another load is deposited on the elevating device 5.

It will here be noted that the retarding device 5 is portable and may be readily positioned in operative relation to a stacker by merely driving or otherwise embedding the anchoring members in the ground.

Suitable plates or strips 28 are preferably secured to the bars 6 on opposite sides of the retarding fingers, said plates also serving to guide the sliding blocks 16, when the latter are adjusted.

While the retarder is preferably designed for use in connection with a stacker it will of course be understood that the same may be used with equally good results in connection with other devices employed for elevating or transferring hay, grain or other material from one place to another.

Having thus described the invention, what is claimed as new is;

1. A device of the class described, including a supporting frame comprising longitudinal bars connected by spaced transverse bars, anchoring pins connected to some of said bars and adapted to be embedded in the ground, retarding fingers projecting upwardly from one side of the frame, and springs secured to the frame and bearing against the retarding fingers for normally and yieldably supporting the latter in upright position.

2. A device of the character described, comprising a supporting frame including spaced, longitudinally disposed bars having slots formed therein and connected by transverse bars, retarding fingers pivotally mounted in said slots and springs secured to the longitudinal bars and having their free ends operating within the slots and provided with terminal portions adapted to bear against the retarding fingers for normally and yieldably supporting the latter in upright position.

3. A device of the class described comprising a supporting frame having spaced longitudinally disposed bars provided with slots and connected by transverse bars, brackets secured to the longitudinally disposed bars, retarding fingers pivotally mounted in the brackets, abutments secured to the longitudinal bars and adapted to bear against one side of each retarding finger, springs secured to the longitudinal bars and having their free ends operating within the slots and provided with anti-frictional rollers adapted to bear against the opposite faces of the retarding fingers for normally and yieldably supporting the latter in upright position and clips for centering the springs on the longitudinal bars.

4. A device of the class described, comprising a supporting frame having longitudinal slots formed therein, retarding fingers pivotally mounted in said slots, longitudinally disposed abutments carried by the frame and arranged to bear against the adjacent faces of the retarding fingers, superposed springs secured to the frame and provided with registering slots, one of said springs being provided with an anti-frictional roller adapted to bear against the opposite faces of the said retarding fingers, and fastening devices extending through slots in the springs for adjusting the tension thereof.

5. A device of the class described including an adjustable supporting frame having intersecting longitudinal and transverse bars, some of which are provided with a series of perforations, bolts connecting the bars at the intersections thereof and extending through the adjacent perforations, retarding fingers pivotally mounted on some of the bars of the supporting frame and projecting laterally from one side of the latter, and springs secured to the frame bearing against the retarding fingers for normally and yieldably supporting the latter in upright position.

JOHN WEDDLE.

Witnesses:
    ANDREW LULL,
    JACOB W. WADLEY.